United States Patent [19]

Ciccolallo et al.

[11] Patent Number: 4,819,877

[45] Date of Patent: Apr. 11, 1989

[54] MODULAR ELEMENT BASED LIQUID DISTRIBUTOR

[75] Inventors: Gino Ciccolallo, Lavagna; Giancarlo Simoni, Genoa, both of Italy

[73] Assignee: Siroflex s.r.l., Italy

[21] Appl. No.: 106,606

[22] Filed: Oct. 8, 1987

[30] Foreign Application Priority Data

Oct. 17, 1986 [IT] Italy .................. 12559 A/86

[51] Int. Cl.[4] .............. B05B 1/20; B05B 1/14; A62C 31/22; A62C 31/02
[52] U.S. Cl. ......................... 239/266; 239/276; 239/396; 239/445; 239/446; 239/551; 239/581.1; 137/883; 137/884; 251/310
[58] Field of Search .......... 239/266, 267, 276, 396, 239/445, 446, 551, 581.1; 251/310; 137/883, 884, 887

[56] References Cited

U.S. PATENT DOCUMENTS

| | | | |
|---|---|---|---|
| 535,669 | 3/1895 | Burt | 239/446 |
| 1,534,406 | 4/1925 | Martocello | 137/883 |
| 2,746,792 | 5/1956 | Hough | 239/276 |
| 4,215,721 | 8/1980 | Hetherington | 137/884 X |
| 4,256,262 | 3/1981 | Rosenberg et al. | 239/276 |

FOREIGN PATENT DOCUMENTS

| | | |
|---|---|---|
| 0116500 | 8/1984 | European Pat. Off. . |
| 2253172 | 6/1975 | France . |
| 2347593 | 11/1977 | France . |
| 2350051 | 12/1977 | France . |

*Primary Examiner*—Andres Kashnikow
*Assistant Examiner*—Patrick N. Burkhart
*Attorney, Agent, or Firm*—Jacobs & Jacobs

[57] ABSTRACT

This invention concerns a liquid distribution system consisting of modular elements fitted with two or more outlets. Each modular element (1) has an external jacket (2) through which one or more tubular ducts (3) pass, each receiving two opposed stopcocks or control valves (15) connecting or shutting off the branch pipes (4) from the internal ports (9, 10) through which the liquid flows, these inner ports (9, 10) being fitted with a projection (12) and recess (11) fitting for assembly of the various elements so as to form the distribution system, the branch pipes (4) being fitted with a spike base (27) to be inserted into the flower pot or into the flower bed, the system permitting the obtaining of a perfect and homogeneous distribution of the liquid at a minimum pressure, low costs, limited space requirements and easy installation.

6 Claims, 4 Drawing Sheets

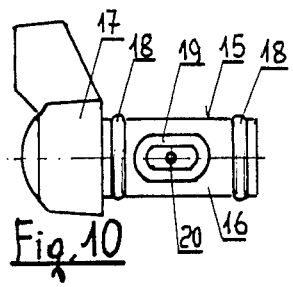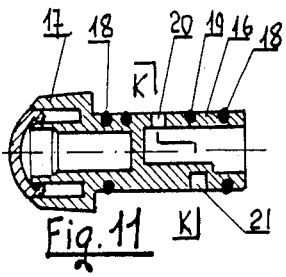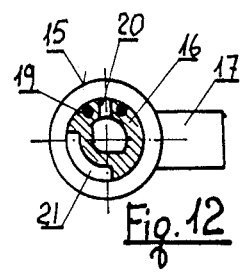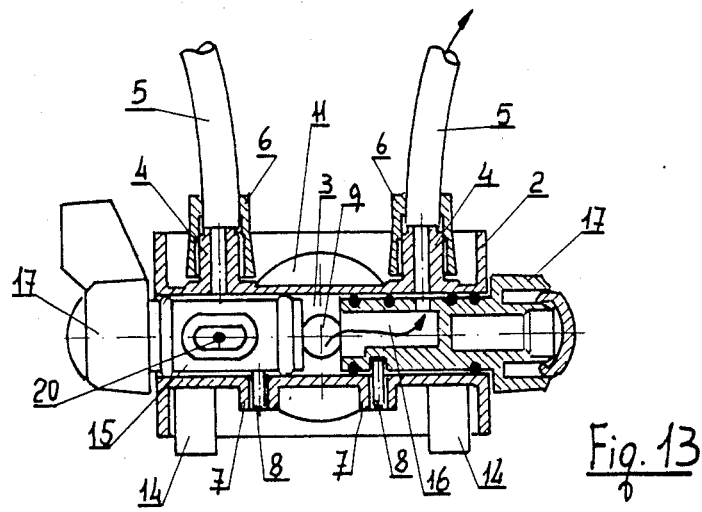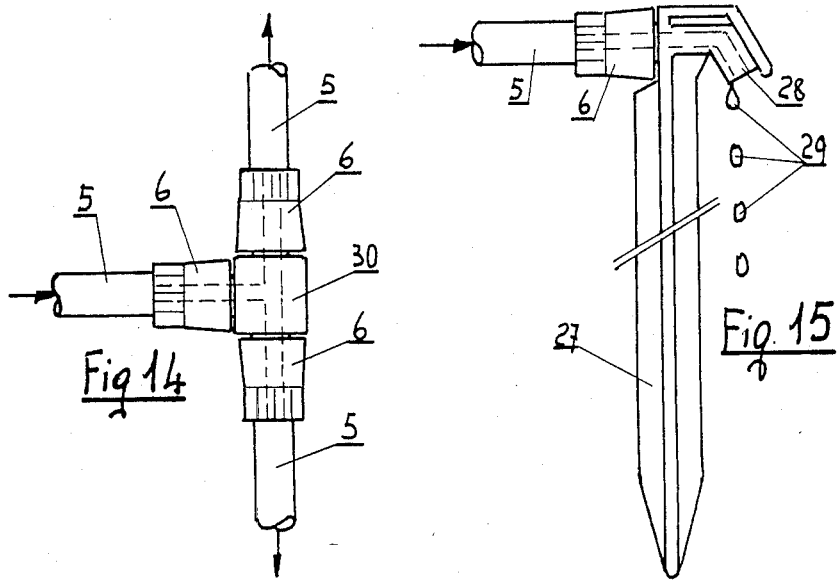

MODULAR ELEMENT BASED LIQUID DISTRIBUTOR

This invention covers a modular element based multiple liquid distribution system particularly designed for programmed and exactly metered watering of the earth in flower pots and beds, although not limited to these applications, since the distribution system may also be used for programmed metering of any additive liquid.

Apart from conventional watering systems (watering cans, static and dynamic sprinklers etc.) other devices are now known which permit differentiated watering of the pots and flower beds, according to need.

Usually, these systems consist of a header from which small tubes fitted with adjustable valves or calibrated diameter tubes are branched off. These systems have, however, several serious drawbacks.

First of all, the supply manifold has to cover a great length before reaching the users farthest away from the water source.

Secondly, the header has to supply progressively all branch pipes, so that watering is usually sufficient only at the beginning of the manifold but may become insufficient or even nil at its ends. Exact metering of the water according to need will always be difficult, also in view of the fact that slight pressure variations during delivery may cause additional misadjustment.

A third drawback lies in the fact that present systems are not easily adaptable to a variation of the irrigation points, since additional points will require further extension of the manifold, thus aggravating the operating conditions at the existing watering points.

Then, there is the fact that water must be delivered at the manifold at a rather high pressure so as to ensure that the water reaches even the most distant watering point, while pressure loss caused by friction and progressive off-takes along the manifold must also be taken into account.

Systems based upon calibrated diameter branch pipes have the disadvantage of requiring replacement of the calibrated tube whenever a flow rate variation is required.

This invention has the objective to eliminate all these drawbacks of existing flower pot and bed watering systems. The invention features a multiple distribution system consisting of modular elements to be assembled together, each modular element being fitted with two or more valve controlled outlets.

This multiple distribution system is highly compact and takes up very little space while allowing for any number whatsoever of branch points. It can be directly connected to a general delivery valve, to a delivery pipe or to a timer controlled valve.

This provides that the pressure inside the distributor is uniform, thus ensuring uniform delivery to an adequate number of users. Any instantaneous pressure variation in the supply line will not effect the pressure in the branch lines which will remain at a constant ratio. With a distributor according to this invention, it will be possible to ensure a perfectly metered irrigation, even at a minimum line pressure and for instance, even with only a few centimeter head on the free soil surface.

Any variation of the irrigation point, for example when adding more flower pots, can be easily met by adding one or more modular distribution elements, without any adverse consequence on the smooth operation of the distribution system.

The various modular elements are assembled by screwing their threaded projecting and recessed fittings together, so that the distribution system can easily be assembled by any person.

The distribution system is particularly suitable for intermittent watering of flower pots on terraces, balconies, in greenhouses, etc. thus eliminating the problem of keeping the plants alive in absence of their cultivator, at low cost and with excellent results.

The invention in question is illustrated in its practical and exemplifying implementation and utilization in the accompanying drawings in which.

Figure 8:
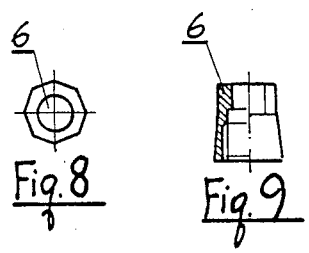
FIG. 8 shows a top view of the fastening cap of the branch pipes.
Figure 9:
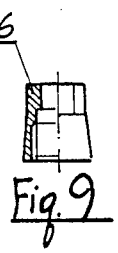
Figure 16:
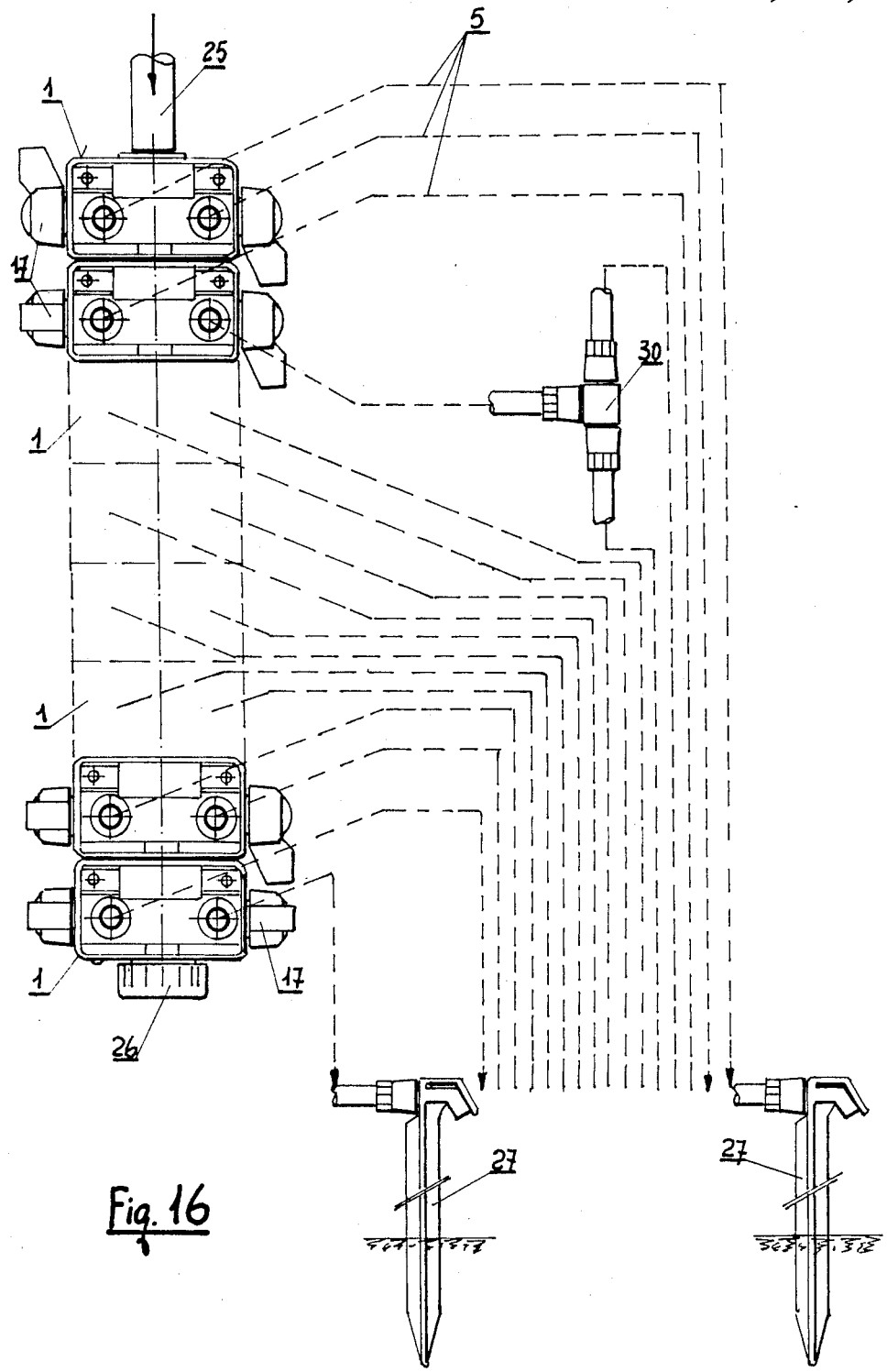
Figure 17:
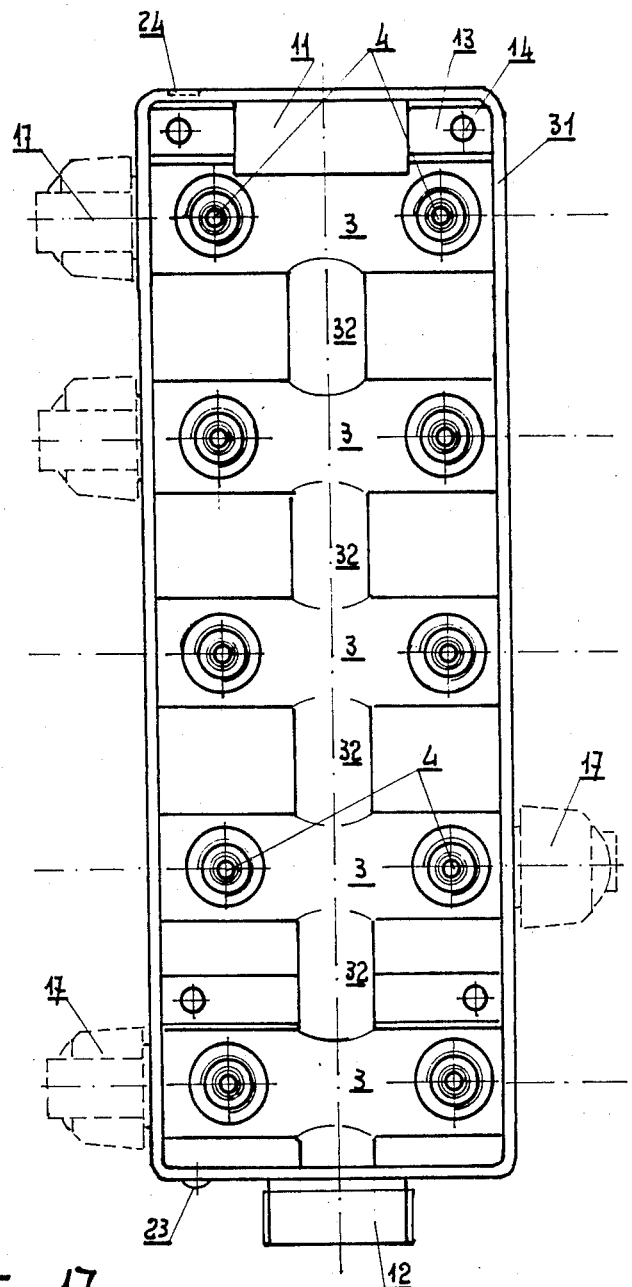

FIG. 9 shows a side view and partial central section of the cap illustrated in FIG. 8, FIG. 10 shows a side view of a stopcock, FIG. 11 shows a central section of the stopcock illustrated in FIG. 10, with 90° rotation, FIG. 12 shows a section of the stopcock taken on line K—K of FIG. 11, FIG. 13 shows a section of a complete modular element, FIG. 14 shows a side view of a Tee union, FIG. 15 shows a side view of a spike base at the end of the branch line to be driven into the earth, FIG. 16 shows an operating diagram of an typical distributor element consisting of eight modular elements each having two branch lines, FIG. 17 shows in top view a modular distributor element having ten outlets.

With reference to these figures, the modular element 1 with two delivery outlets is the minimum modular element required to form the distributor.

It consists of a lateral jacket 2 through which the duct 3 passes, this duct has at its upper end two branches 4 consisting of connectable branch tubes 5 secured by a screw cap 6 and at its lower end two cylindrical elements 7 with a bore adapted to receive the locking pins 8 which limit rotation of the stopcocks or flow control valves 15, described hereinafter.

The transverse duct 3 has in its central portion, at right angle to its axis, two opposed ports or openings 9 and 10, respectively leading to a reclosed fitting 11 and a projecting fitting 12, both having the same threading. The feed water flows through these ports 9 and 10 to the distributor.

Expansions 13 fitted with drilled cylindrical stubs 14 are located on each side of the reclosed fitting 11, adapted to receive suitable devices for wall mounting, such as expansion screws, nails etc. for fixed positioning of the distributor.

Two stopcocks 15 for adjustment of the flow are located in the transverse duct 3. Each stopcock consists of a hollow cylindrical element 16 and a control head 17. The valve body has two external concentric annular gaskets 18 at both ends as well as a substantially elliptically shaped gasket 19, recessed in the external cylindrical surface of the body, the center of which has a through-hole 20 communicating internally of the hollow cylindrical element 16. This through-hole 20 coincides with the port 4 in the branch line so that when the two ports 20 and 4 are coaxial (stopcock in open position), the fluid can freely flow through the openings 9 and 10 and through the body 16 of the stopcock to the delivery pipe 5, while this flow is prevented when the ports 4, 20 are not in coaxial position (stopcock closed).

Obviously, there are intermediate positions between the completely open and completely closed position of the stop-cock, so that the water flow rate can be adjusted according to need.

One end of the cylindrical body 16 is provided with a radial slot 21 covering an angle of slightly more than 90° lodging the tip of the locking pin 8 mounted in the hollow cylindrical body 7 of the modular element 1. This locking pin 8, acting in the slot 21, determines the maximum opening and closing positions of the valve 15 while preventing the valve from slippng from its seat, i.e. from coming out of the tubular duct 3.

FIG. 13 shows a cross section of the modular element 1 complete with stopcocks 15 (one open and the other in closed position) and the branch tubes 5.

Figure 1:
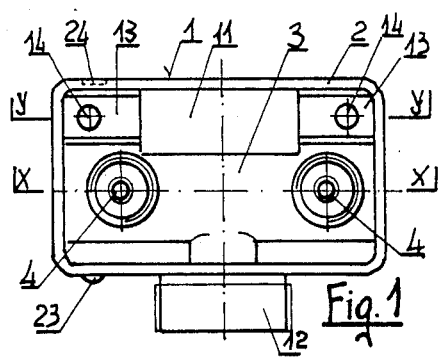
FIG. 1 shows a top view of a modular element of a 2-outlet distribution system.
Figure 2:
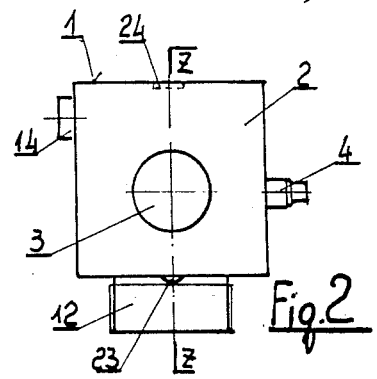
FIG. 2 shows a side view from the left of the element illustrated in FIG. 1.
Figure 3:
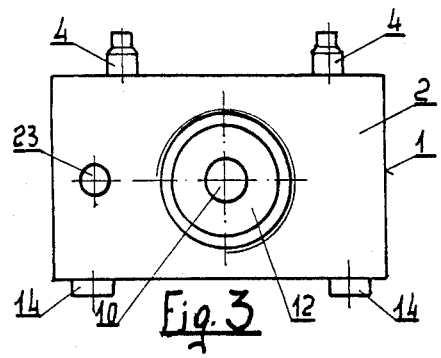
FIG. 3 shows a top view of the element illustrated in FIG. 1.
Figure 4:
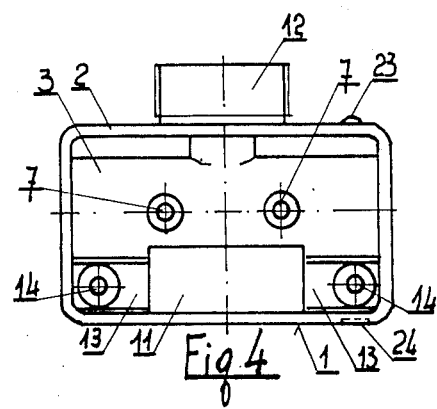
FIG. 4 shows a view from below illustrated in FIG. 1.
Figure 5:
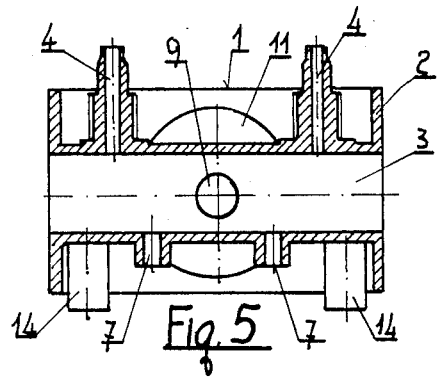
FIG. 5 shows a vertical section of the modular element according to X—X of FIG. 1.
Figure 6:
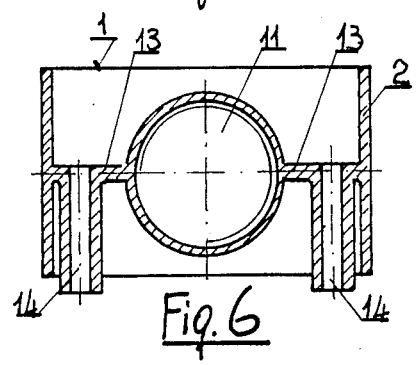
FIG. 6 shows a vertical section of the modular element taken on line Y—Y of FIG. 1.
Figure 7:
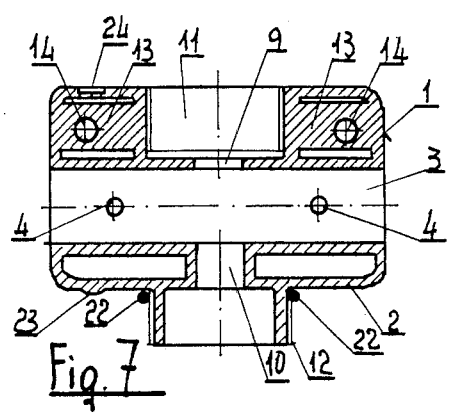
FIG. 7 shows a vertical section of the modular element taken on line Z—Z of FIG. 2.

According to the invention, each modular element is assembled adjacent to the next thus forming a distribution system as illustrated for exemplification in FIG. 16 featuring eight elements and 16 independent delivery points. Each modular element 1 can be connected to the next modular unit by screwing the threaded projecting fitting 12 in the recessed fitting of the other element, after insertion of a sealing gasket 22, as shown for example in FIG. 7.

Perfectly flat alignment of the various assembled elements is ensured for each element 1 by a prominence 23 and a recess 24 located on opposed external transverse surfaces on the side of the jacket 2, so that the prominence 23 of one element will enter the recess 24 of the other element of the assembly, thus ensuring perfect alignment and stable positioning of the various elements.

Numerous elements 1 can be assembled to form the distribution system according to need and it is also possible to change at will the number of these elements simply by adding or removing elements, which are screwed together.

It is clear that in a distribution system consisting of several elements, the ports 9 and 10 in the fittings 11, 12 will create one single longitudinal central duct connecting the various elements and feeding all valves 15 of the distributor at a uniform pressure.

The distributor system is supplied through a main duct 25 mounted on the fitting at one end of the system while the other end is closed by a plug 26.

The main duct 25 may be fitted with a shut-off valve (not indicated on the drawing) instead or with a timer for automatic control of the irrigation and rest time of the distributor according to the climate, humidity, type of soil etc..

Each branch tube 5 is connected to a spike base 27 with cross shaped spike, the top of which has a boring in which to fit the tube 5 by means of a threaded cap nut 6 linked up to a downwardly bent pipe section 28, from which the water flows either dropwise or in a jet. This spike is driven into the earth of the flower bed or pot deep enough to ensure stability.

Large or particularly long pots can be watered with one single tube 5 and two parallel spike bases 27 interconnected by a Tee union 30, as shown in FIGS. 14 and 16.

The above clearly shows the operation of the distribution system, complete with its accessories as illustrated in FIG. 16, in which some of the valve cocks are open and some are closed.

So far, a description has been given of a multiple distributor system consisting of modular elements each having two outlets, but it is also possible to envisage a multiple distribution system consisting of four, six etc. outlets, always within the scope of the invention.

FIG. 17 shows an example of a modular element with 10 watering points, consisting of a jacket 31, featuring along its longer sides five transverse tubular ducts adapted 3 to receive five pairs of stopcocks 15. Each transverse duct 3 has the same configuration as the element with two outlets already described above, i.e. it has two connectable branch tubes 4 and two seats for the plugs 8, whereas the ports 9 and 10 through which the liquid flows are replaced by longitudinal pipe sections 32 connecting the various transverse ducts 3 and linked up at one end to the threaded recessed fitting 11 and at the other end to the projecting fitting 12.

This multiple element will involve an indispensable number of expansions 13 fitted with drilled cylindrical stubs 14 for wall mounting of the distribution system.

This multiple element of FIG. 17 can be joined with other multiple elements and/or with other modular elements with two delivery outlets, to form the necessary distributor system.

For instance, watering of 36 flower pots will require assembly of:
- 3 elements each having ten branch tubes and 3 elements each having two branch tubes or else
- 2 elements each having ten branch tubes plus 8 elements of two branch tubes each, or else
- 18 elements each having two branch tubes, or
- 6 elements each having six branch tubes.

Obviously, construction of a multiple branch-point element will be simpler and cheaper than a two-branch element. Therefore, when a larger number of flower pots has to be watered, it is advisable to use a maximum number of multiple-branch elements.

If the pots and flower-beds to be watered cover a large area, the distributor system should be located in the center of the pots, while covering a certain distance with the supply manifold.

It would also be possible to split the manifold in two branches each supplying one multiple distributor.

Therefore, according to this invention, the flower beds and pots can be watered uniformly and perfectly distributed, even at rather limited delivery rates, moderate installation costs and unlimited possibility to change the watering outlets, which do not affect in any way whatsoever the operation of the distribution system.

We claim:
1. Multiple liquid distribution system, consisting of modular elements each having two or more independent valve controlled outlets, characterized by the fact that each two-outlet modular element (1) consists of: (a) a body with lateral jacket (2) through which a tubular duct (3) passes transversely, provided at its upper part with two branch pipes (4) to be plugged in (5) and secured by means of a cap nut (6), and at its lower end two drilled cylindrical bodies (7) for stable installation of the stopcocks or valves (15) by means of a plug (8) and also providing two opposed ports (9, 10) located at right angle to the body axis, leading to two fittings, one recessed (11) and the other projecting (12) having the same threading, through which the liquid flows, (b) two opposed stopcocks or control valves (15) located within the transverse duct (3) each valve cock consisting of a hollow cylindrical body (16) and a control head (17), the cylindrical body (16) and a control head (17), the cylindrical body beng provided at both ends with a coaxial annular gasket (18) and with a recessed substantially elliptical gasket (19) on the outer surface of the body, in the middle of which is a through-hole (2) coinciding with the branch tube (4) of the duct (3), thus ensuring communication between the valve (16) and the branch tube (4) when the cock is open, so that the liquid can freely flow through the ports (9, 10) of the duct (3) into the watering pipe (5), the valve body (16) being provided at one end with a radial slot (21) covering an angle of slightly more than 90°, adapted to receive the pin (8) fitted into the drilled cylinders (7) of the body (1) so as to prevent rotation and to determine the maximum opening and closing positions of the stopcock (c) the necessary number of spike bases (27) to secure and support the watering tube (5) at the outlet point, (d) a number of Tee Unions to convey the flow of each branch pipe (5) to two tubes feeding two spikebases, so that when assembling a given number of modular elements, by screwing the projecting fitting of one element to the recessed fitting of the next element, it will be possible to form a multiple distribution system according to need, this system being connected by its free end to a supply main (25) whereas the other end fitting is closed by a plug (26) thus making it possible to feed the various branch tubes (5) at a controlled flow rate for uniform watering of flower beds and/or pots by means of appropriate Tees (30) and spike bases (27) at low delivery rates, unaffected by pressure variations, even if the number of elements forming the distribution system is changed.

2. Distribution system as described in claim 1 characterized by the fact that each element is provided with expansions (13) fitted with drilled cylinders (14) adapted to receive fastening devices for wall mounting of the distributor system.

3. Distribution system as described in claim 1, characterized by the fact that each modular element has a projection (23) and a recess (24) on its transverse opposed external surfaces (2), so that upon assembly of two elements, penetration of the projection of one element into the recess of the other adjacent element will cause perfect alignment and reciprocal stable positioning of the elements in question.

4. Distribution system as described in claim 1, characterized by the fact that elements having more than two branch pipes are provided with a lateral jacket (31) featuring between its longitudinal sides more than one transverse tubular duct (3) each to be fitted with a pair of valves (15), these transverse ducts (3) being interconnected by longitudinal pipe sections (32) linked up to the recess (11) and projection (12) end fittings of each 2-branch element.

5. Distribution system as described in claim 1, characterized by the fact that it is useful for programmed metering of any liquid, for any process or application.

6. Distribution system as described in claim 1, characterized by the fact that the general supply mains (25) are fitted with a manual or timer controlled shut-off valve.

* * * * *